United States Patent [19]

Shouse, Jr.

[11] 4,184,104
[45] Jan. 15, 1980

[54] SCAN COMPENSATION CIRCUIT FOR A TELEVISION RECEIVER

[75] Inventor: John F. Shouse, Jr., Portsmouth, Va.

[73] Assignee: General Electric Company, Portsmouth, Va.

[21] Appl. No.: 738,155

[22] Filed: Nov. 2, 1976

[51] Int. Cl.² ............................................. H01J 29/56
[52] U.S. Cl. ..................... 315/371; 315/386; 315/389
[58] Field of Search ............... 315/370, 371, 383, 386, 315/411, 389, 400

[56] References Cited

U.S. PATENT DOCUMENTS

| | | | |
|---|---|---|---|
| 3,072,741 | 1/1963 | Ahrons et al. | 315/383 |
| 3,417,282 | 12/1968 | Hall | 315/370 |
| 3,427,496 | 2/1969 | Wood | 315/411 |
| 3,668,463 | 6/1972 | Smith et al. | 315/370 |
| 3,825,793 | 7/1974 | Dietz | 315/371 |
| 3,953,765 | 4/1976 | Arai | 315/389 |
| 3,959,689 | 5/1976 | Ikoma | 315/387 |
| 4,006,385 | 2/1977 | Onodera | 315/400 |
| 4,074,323 | 2/1978 | Griffey | 315/411 |

Primary Examiner—Theodore M. Blum

[57] ABSTRACT

Abrupt transitions in the televised scene between areas of low and high brightness can occasion horizontal sweep system loading to produce raster distortion. Scan compensation circuitry which utilizes the loading of the horizontal sweep system as an input corrects raster position distortion, raster width distortion and raster tearing distortion. Position distortion is corrected by delay of the start of horizontal retrace in order to shift the start of trace. Control of horizontal yoke drive to maintain an appropriate ratio of yoke drive to CRT anode voltage serves to corrects width distortion. Raster tearing is prevented by limiting the drive to the picture tube when sweep system loading would exceed a predetermined threshold.

8 Claims, 9 Drawing Figures

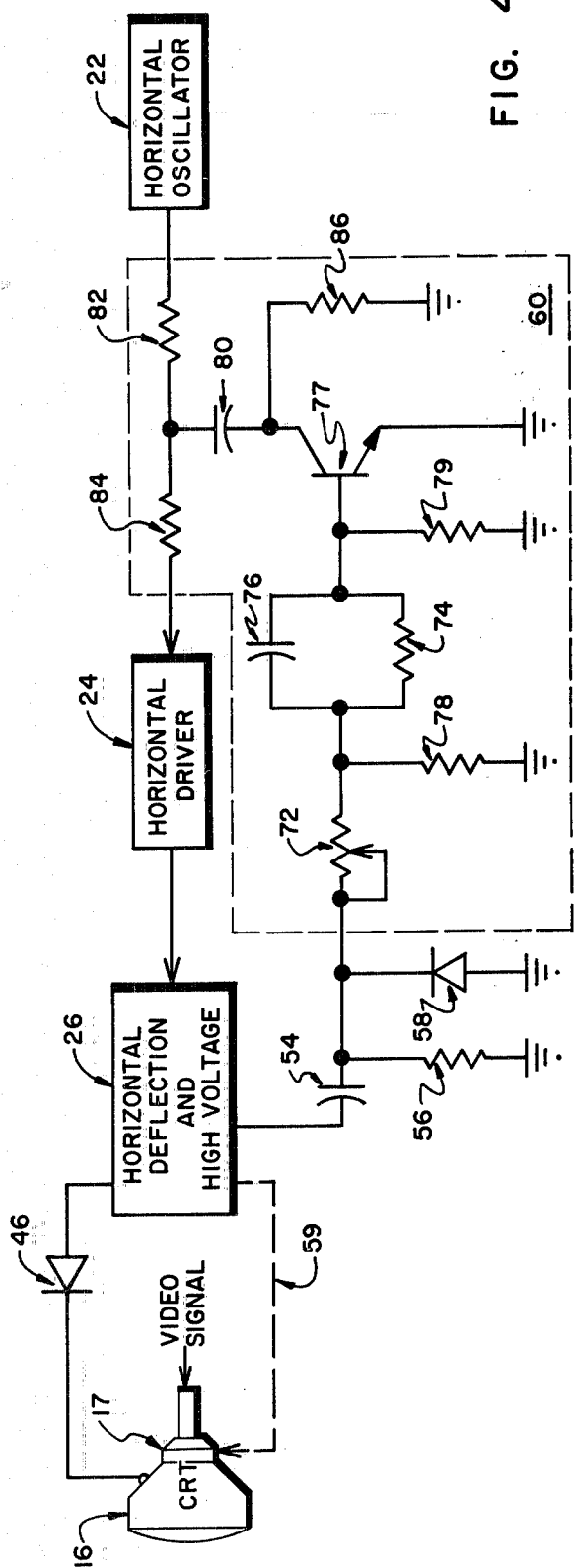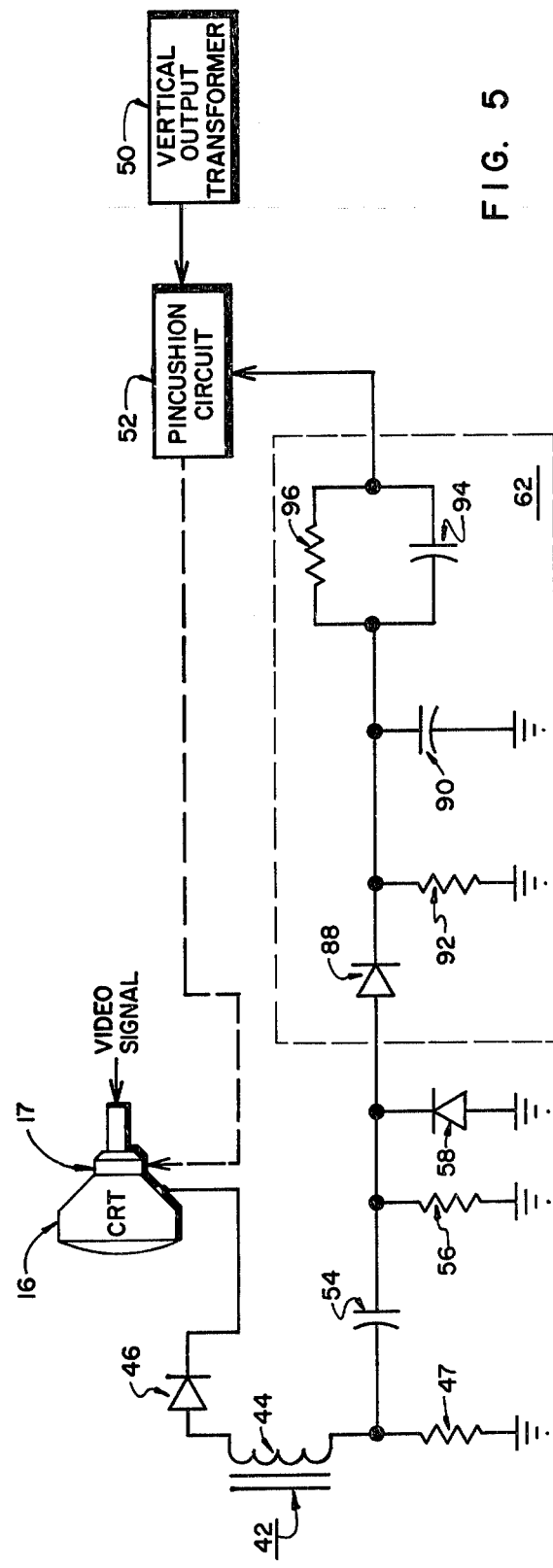

SCAN COMPENSATION CIRCUIT FOR A TELEVISION RECEIVER

BACKGROUND OF THE INVENTION

The present invention relates to television picture distortion correction and more particularly to a scan compensation circuit for correcting raster position distortion, raster width distortion, and raster tearing distortion.

In modern television receivers it is standard practice to employ the horizontal output or flyback transformer of a horizontal sweep system as a source of high voltage bias for the cathode ray tube (CRT) of the receiver. During periods of high CRT brightness levels, instantaneous CRT beam current increases can subject the horizontal sweep system to loading resulting in several different forms of undesirable raster distortion.

In the case of a sharp transition from a low brightness area in the televised scene to an area of high brightness, instantaneous beam current sharply increases. If the area of high brightness is sufficiently extensive, such as in a scene including a sunset where a band of brightness extends across an otherwise predominantly dark scene, the duration of the instantaneous beam current rise will extend beyond the filtering time constant of the CRT anode capacitance. Although the longer time constant, automatic frequency control (AFC) circuit will respond eventually to compensate for certain effects of loading of the horizontal sweep system, during the time period before the AFC circuit responds, problems attendant to loading of the horizontal sweep system persist. This loading reduces the reactive energy level in the sweep transformer and in turn reduces the reactive energy level in the yoke. This process of energy level reduction causes a shift in horizontal sweep position which appears in the televised scene as position distortion.

High instantaneous beam current of duration longer than can be effectively filtered by CRT anode capacitance and of shorter duration than can be effectively dealt with by longer time constant circuitry such as AFC and beam current limiters will be referred to herein as short duration high beam current.

The loading of the horizontal sweep system also occasions lowering of the high voltage to the CRT so that electron energy decreases and the electron beams are subject to greater deflection than desired. Such unbalance results in size blooming or raster width distortion.

An attempted solution to correct raster width distortion is to deregulate the voltage supply to the horizontal output transformer to permit some tracking of horizontal yoke drive to CRT anode voltage. This can be occasioned by placing a resistor in series with the supply voltage so that the loading of the horizontal sweep system will result in a voltage drop across the series resistor to appear as a tracking drop in yoke drive. The compromise of such solutions is the reduced efficiency of the horizontal sweep system resulting in reduced image brightness and sharpness. Horizontal sweep system as used herein is intended to include the horizontal deflection and high voltage system. It is also intended that the words scan and sweep are synonymous.

Raster tearing distortion can occur when the short duration beam current is excessively high so that the horizontal sweep system is loaded to the point that the horizontal output transformer saturates. Where the duration of the excessive beam current is sufficient the beam current limiting circuit of the receiver, which senses essentially average beam current can effectively limit beam current. However, when the excessively high beam current rise occurs over a shorter period of time than can be responded to by the long time constant action of the beam current limiter, scan compensation correction is required.

The high brightness levels required by television users, particularly in viewing areas illuminated by fluorescent lighting such as is common in television showrooms, increases the need for a scan compensation circuit capable of controlling short duration high beam current related raster distortion.

It is accordingly an object of the present invention to control raster distortion due to short duration high beam current in the cathode ray tube of the television receiver.

It is another object of the present invention to control raster width, raster position, and raster tearing distortion due to short duration high beam current in the cathode ray tube of a television receiver.

Another object is to monitor horizontal sweep system loading and to utilize such loading as an input to control raster width, raster position and raster tearing distortion due to short duration high beam current in the cathode ray tube of a television receiver.

A solution to the above-noted raster distortions is to beef up the deflection system. Thus, with a more efficient yoke, a heftier flyback transformer and output transistor, the effects of system loading can be reduced. However, such a solution is the route of higher cost, higher power consumption and higher operating levels.

It is accordingly another object of the present invention to inexpensively correct raster position, raster width and raster tearing distortions by means of scan compensation.

SUMMARY OF THE INVENTION

To achieve the foregoing objects and in accordance with the purposes of the invention as embodied and broadly described herein, the scan compensation circuit of this invention comprises a sensing circuit coupled to the horizontal flyback transformer to develop a reference signal proportional to instantaneous tertiary current in the tertiary winding of the flyback transformer. This signal may preferably be in the form of voltage pulses reflective of the tertiary current. In the case of raster position distortion, the scan compensation circuit utilizes the reference signal as an input to correct raster position distortion by delaying the start of horizontal retrace by controlling the instant of turn off of the horizontal output transistor. To correct raster width distortion the scan compensation circuit utilizes the reference signal as an input to vary horizontal yoke drive in accordance therewith. In this manner yoke drive is enabled to track CRT anode voltage. In a preferred embodiment of the invention, this change in yoke drive is achieved through operation of the pincushion correction circuit of the receiver. To correct for raster tearing distortion the scan compensation circuit again in response to horizontal sweep system loading as represented by the reference signal, prevents saturation of the horizontal output transformer by limiting the amplitude of the video signal to the cathode ray tube in response to the amplitude of the reference signal.

BRIEF DESCRIPTION OF THE DRAWINGS

A greater appreciation of the objects and advantages of the invention may be understood by a detailed description taken in conjunction with the drawings, wherein:

FIG. 4 is a circuit diagram of one embodiment of the dynamic position compensation circuit shown in FIG. 3;

FIG. 5 is a circuit diagram of one embodiment of the dynamic width compensation circuit shown in FIG. 3;

DETAILED DESCRIPTION

Reference will now be made in detail to the present preferred embodiment of the invention, an example of which is illustrated in the accompanying drawings.

Figure 1A:
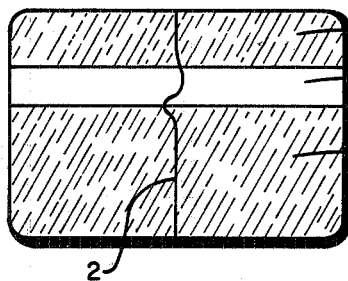
FIGS. 1a-1c show front views of a cathode ray tube screen and illustrates three types of picture distortion.

Referring to FIG. 1 there are shown three television scenes each including a dark or low brightness upper portion 3, a high brightness portion 7 which is depicted as a white bar across the raster, and a bottom low brightness portion 5. In FIG. 1a a vertical line 2 in the scene is shown to have been shifted in position to the right during the white bar 7 and then to the left at the point of transition back to the dark area 5 before it settles down to the vertical line intended. FIG. 1a thus illustrates the effect of position distortion in a scene where areas of high and low brightness abut each other. Such distortion is occasioned, as was described above, where the increase in instantaneous beam current persists beyond the filtering capability of CRT capacitance and not long enough for the AFC circuit to compensate. Of course, in the case where the high brightness area is of longer duration so that AFC begins to correct the position distortion scan compensation still is desirable to correct distortion prior to AFC action.

Figure 1B:
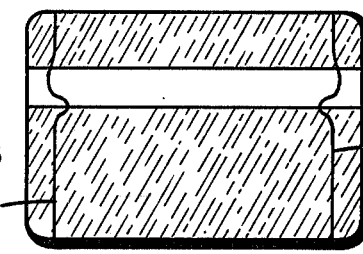

In FIG. 1b the effect of raster width distortion is illustrated. Again the same scene characteristic of dark and bright abutting areas is shown. This distortion is evidenced again by vertical lines, here 4 and 6, showing a bending outward in the white area at the edge of the picture, followed by a bending in at the white to dark transition and then back to vertical after the disturbance represented by the dark-bright-dark transition has passed.

The width distortion of FIG. 1b will occur at the same time as position distortion. Both distortions result from short duration high beam current and the concomitant loading of the horizontal sweep system. However, width distortion is experienced because of lower CRT anode voltage under these circumstances. Since less energy is imparted to the electron beams for a given yoke field, greater deflection than is desired results. This effect is most pronounced at the sides of the raster and is known as size blooming.

Figure 1C:
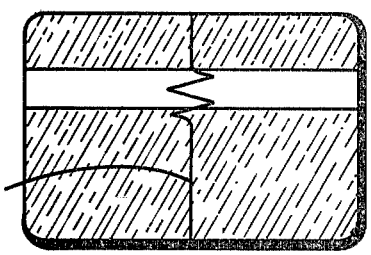

FIG. 1c shows an identical scene to FIGS. 1a and 1b but now the vertical line is more jagged and respresents a tearing effect in the picture in the region of the dark-bright-dark transition. Such distortion is realized where the intensity of the bright portion 7 of the scene is high enough that the resulting excessively high short duration beam current and the high tertiary current resulting in the loading of the horizontal sweep system is sufficient to saturate the flyback transformer.

Figure 2:
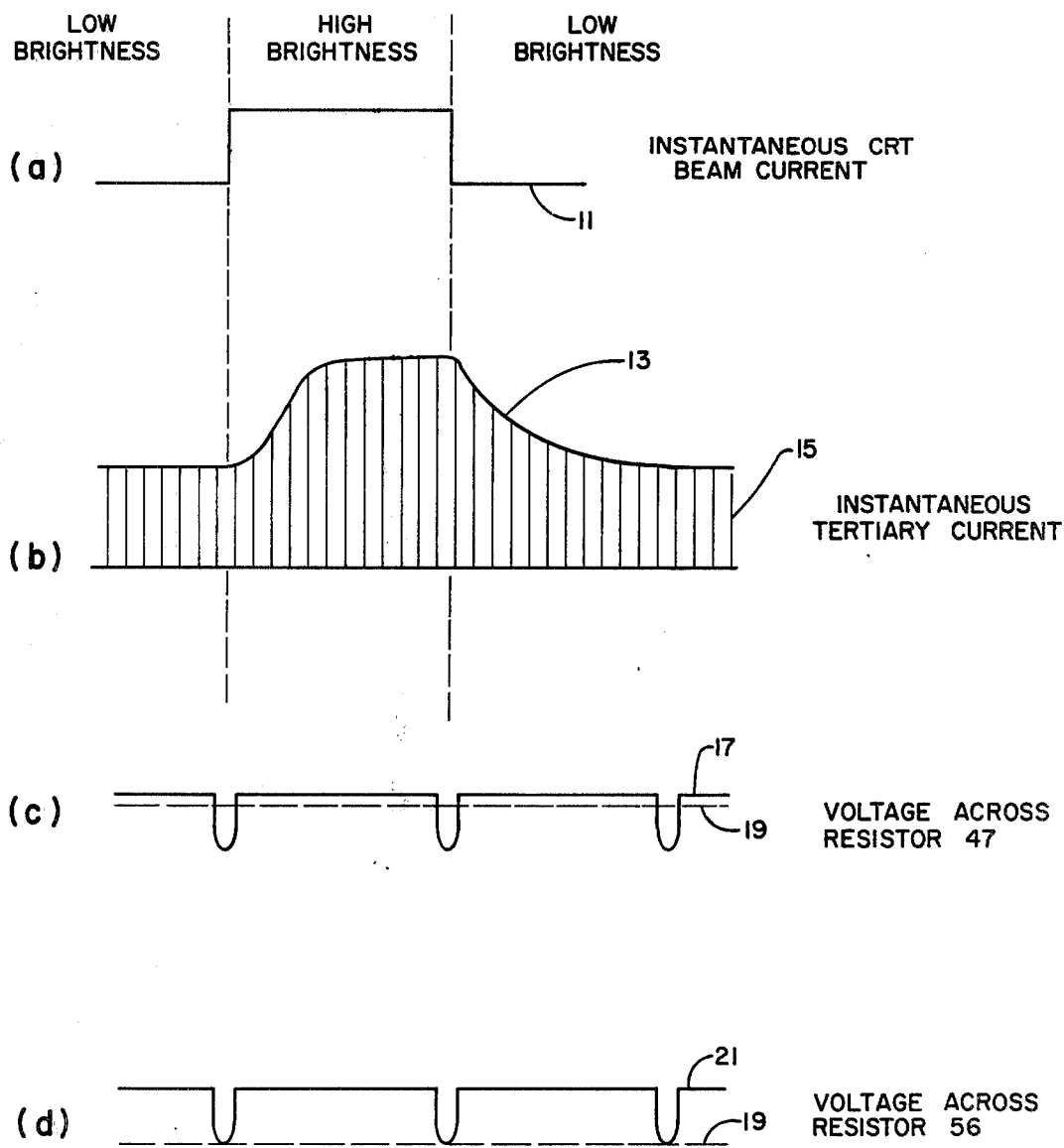
FIG. 2 shows waveforms indicative of performance of the cathode ray tube, the horizontal sweep system and the scan compensation circuit of the present invention.

Referring now to FIG. 2, in FIG. 2a the instantaneous CRT beam current is shown by curve 11 during the periods of the first low brightness area of the scene, the abutting high brightness area and the final low brightness area. The affect of the shift in instantaneous beam current on the horizontal sweep system is reflected in FIG. 2b by the instantaneous tertiary current realized by voltage pulses 15 appearing across a tertiary current sampling resistor. The curve 13 depicts the amplitude of these pulses. FIG. 2b will be discussed further below, along with FIGS. 2c and 2d.

Figure 3:
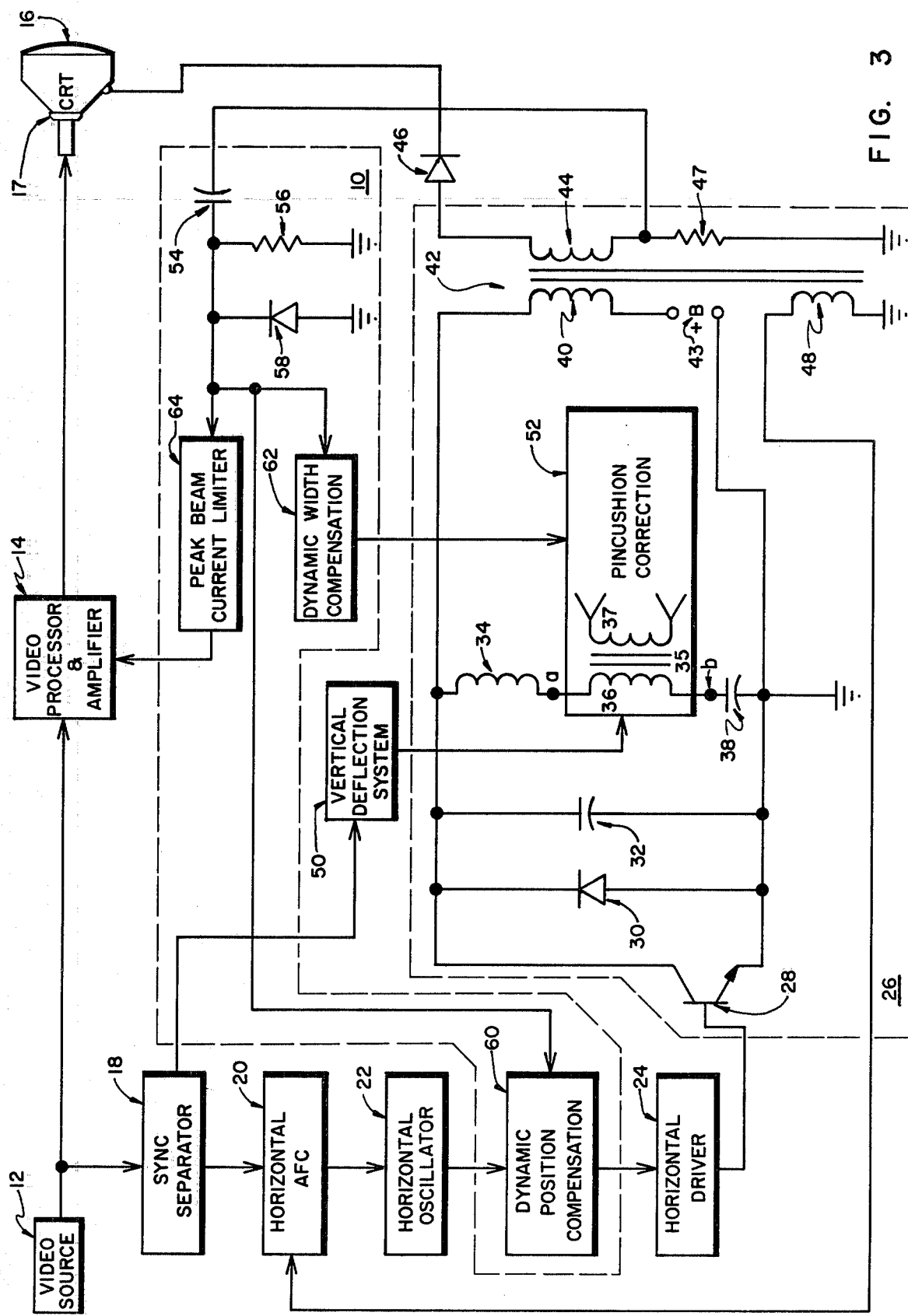
FIG. 3 is a block diagram of a portion of a television receiver incorporating a scan compensation circuit in accordance with a preferred embodiment of the present invention.

Referring to FIG. 3, there is illustrated a block diagram of a television receiver incorporating the scan compensation circuit 10 of this invention. A representative portion of an ordinary television receiver is depicted in FIG. 3, excluding scan compensation circuit 10. In particular a video source 12, supplies a video signal to video processor and amplifier 14. This video signal, upon processing and amplification in video processor and amplifier 14 is applied to modulate electron beam current in cathode ray tube (CRT) 16. A yoke 17, adjacent CRT 16, controls the deflection of the electron beam across the face of CRT 16. Sync pulses from video source 12 are separated out by sync separator 18 and applied to horizontal automatic frequency control (AFC) circuit 20 and to vertical deflection system 50. As is well known in the art, horizontal AFC circuit 20 locks horizontal oscillator 22 to the desired frequency and phase needed to control horizontal driver circuit 24. Horizontal driver circuit 24 in turn controls the operation of horizontal sweep system 26.

Horizontal sweep system 26 comprises horizontal output transistor 28, damper diode 30, damping capacitor 32, horizontal deflection winding 34 of yoke 17, winding 36 of pincushion correction circuit 52, "s" shaping capacitor 38, flyback transformer 42 and +B supply voltage 43. As is well known in the television art, horizontal output transistor 28, or an equivalent switching device, receives at its base or other input terminal the output from horizontal driver 24. In addition, damper diode 30, damping capacitor 32, the series combination of deflection winding 34, winding 36, "s" shaping capacitor 38, the series combination of primary winding 40 of flyback transformer 42 and supply voltage 43 are all connected in parallel to one another across the emitter and collector of horizontal output transistor 28.

Tertiary winding 44 of flyback transformer 42 is connected by means of a high voltage rectifying device, such as is shown by the symbolic diode 46, to provide the anode and other high voltages to CRT 16. The low end of tertiary winding 44 is connected to ground or other reference potential through resistor 47. A winding 48 of flyback transformer 42 is connected to supply a control signal to horizontal AFC 20.

As is also well known in the art, vertical deflection system 50 in response to the vertical sync pulses from sync separator 18 provides a vertical sawtooth current to side pincushion correction circuit 52. Pincushion correction circuit 52 influences winding 36 by means of control winding 37, as will be described more fully below.

In the operation of the horizontal sweep system, horizontal output transistor 28 is switched on and off by horizontal driver 24, which in turn is controlled by horizontal oscillator 22 under the influence of AFC circuit 20, to provide a horizontal sweep current through horizontal deflection winding 34, causing sequential horizontal traces and retraces across the face of cathode ray tube 16.

As is well known, the horizontal flyback pulses are stepped up by transformer 42 to provide higher amplitude pulses across tertiary winding 44 to be applied as a high voltage to the anode of CRT 16 by the rectifying device 46.

As was described above, normal operation of the sweep system can be interferred with when short duration high beam current is present such as during a bright horizontal bar across the face of CRT 16 as shown in FIG. 1. The high beam current draws increased current from tertiary winding 44 which changes the reactive energy balance in the sweep transformer 42 and in turn changes the reactive energy balance in the yoke causing a shift in horizontal sweep position. Although transformer winding 48 provides an input to horizontal AFC circuit 20 indicating the misalignment of horizontal trace lines, horizontal AFC circuit 20 must, of necessity, exhibit a reaction time period sufficiently long to provide immunity to airplane flutter and other noise. This long time period introduces a time lag which prevents instantaneous correction by horizontal AFC circuit 20 and may instead actually result in an under and then over correction causing additional raster distortion if in fact the AFC circuit 20 is allowed to react to short duration high CRT beam current.

In addition, the short duration high beam current loads down the horizontal sweep system, thereby lowering the high voltage anode supply to the CRT so that electron energy decreases and the beams are subject to greater deflection than desired. Raster width distortion in the form of size blooming results.

Also, raster tearing can occur during this time of short duration high beam current if the intensity and duration thereof is such that tertiary current is so great that the flyback transformer saturates.

The solution to these distortion problems offered by the present invention is to be found in scan compensation circuit 10, as shown in FIG. 3 to include means to provide a reference signal indicative of the loading of the horizontal sweep system. Such means may include, for example, resistor 47 which provides a DC return for tertiary current and develops a representative voltage thereacross. This voltage, as shown in FIG. 2c, is in the form of pulses at the horizontal rate. FIG. 2c shows that the voltage pulses across resistor 47, because of transformer action are not referenced to ground potential, which is indicated by dashed line 19. Thus, there is also provided as part of the sensing circuit a capacitor 54 interconnecting resistor 47 with resistor 56 and diode 58. Capacitor 54 serves to block DC and is small in value to enable rapid charge and discharge, the discharge being into resistor 56. The value of resistor 56 is selected to obtain a preferential level of the voltage pulses, which may or may not be the same as realized across resistor 47. Diode 58 in parallel with resistor 56 is enabled by the DC blockage of capacitor 54 to establish a new DC reference level, shown in FIG. 2d to be substantially at ground. The referencing of the voltage pulses to a new DC level, preferably ground for the scan compensation circuitry shown, enables the instantaneous amplitude of these pulses relative to a known reference level to control the remainder of the scan compensation circuitry.

Scan compensation circuit 10 includes dynamic position compensation circuit 60, dynamic width compensation circuit 62, and peak beam current limiter 64. Dynamic position compensation circuit 60 corrects raster position distortion occasioned by the loading of the horizontal sweep system during periods of short duration high beam current by delaying the instant of turn off of the horizontal output transistor 28. The loading of the sweep system reduces the reactive energy level in the sweep transformer and in turn in the yoke during the first half of sweep. With less energy in the yoke this energy dissipates sooner to arrive at zero deflection in a shorter period of time requiring the horizontal output transistor to conduct longer. Assuming essentially constant retrace time, in practice it may not be constant, the resulting raster is pulled in on the left due to the shorter yoke energy dissipation time and pushed out on the right. This phenomenon has been illustrated in FIG. 1a.

If the instant of turn off of horizontal output transistor 28 is delayed, more stored energy builds up in the sweep transformer 42 and the yoke during retrace so that more energy is available in the yoke during the first half of sweep. The effect is to occasion shift of the video back to the left.

The problem of the shift in video to the right during the bright area of the scene can also be a function of stored charge in the horizontal output transistor, depending upon the operating level of this transistor. This transistor can experience increased collector current during the period of high beam current to turn off sooner due to earlier depletion of stored charge. Thus, the delay of turn off time occasioned by dynamic position compensation circuit 60 compensates for this timing shift also.

Referring to FIG. 4, there is shown a portion of the television circuit from FIG. 3 with a specific example of dynamic position compensation circuit 60. In FIG. 4, CRT 16 is shown being supplied with an anode voltage from horizontal sweep system 26 by rectifying means 46. The drive for the horizontal deflection windings of yoke 17 is supplied by circuit 26 as indicated by dashed line 59. As discussed above, the control of the horizontal windings of yoke 17 is effected by circuit 26 through operation of horizontal driver 24 which operation is in turn governed by horizontal oscillator 22. FIG. 4 further shows capacitor 54, resistor 56 and diode 58, which components again provide DC referenced voltage pulses proportional to the instantaneous tertiary current in system 26.

In accordance with the present invention, dynamic position compensation circuit 60, FIG. 3, provides delay of the instant of turn off of horizontal output transistor 28 in response to the referenced voltage pulses developed across resistor 56. Again, it is noted that due to the DC isolation provided between tertiary current detecting resistor 47 and resistor 56 by capacitor 54, diode 58 is enabled to establish a new DC reference for the voltage pulses. By referencing the voltage pulses to ground for example, the instantaneous amplitude of these pulses becomes available to drive the scan compensation circuit of the type illustrated.

The embodiment of dynamic position compensation circuit 60 illustrated in FIG. 4 comprises a series combination of resistor 72 and the parallel combination of resistor 74 and capacitor 76 coupled to deliver the referenced voltage pulses across resistor 56 to the base of transistor 77. Resistors 78 and 79 are connected, one on each side of the parallel combination of resistor 74 and capacitor 76 and are in turn connected to ground. The emitter of transistor 77 is connected to ground while the collector of transistor 77 is connected to one side of capacitor 80. The other side of capacitor 80 is connected between the series combination of resistor 82 and resistor 84. This series combination of resistors 82 and 84 is in turn connected between horizontal oscillator 22 and horizontal driver 24. Resistor 86 is connected from the collector of transistor 77 to ground.

In operation, resistors 72 and 78 attenuate the referenced voltage pulses from resistor 56, resistor 72 preferably being adjustable to optimize the signal applied to the base of transistor 77. With regard to the remaining components in the base circuit of transistor 77, since both the AFC circuit 20 and position correction circuit 60 will attempt to respond to correct the position error, in order that these two circuits complement each other instead of interfering with each other, the time constant of the components 74, 76, 79 and the base input impedance of transistor 77 is chosen to complement the time constant of the AFC circuit.

Transistor 77 acts essentially as a signal controlled variable resistor having collector bias supplied from horizontal oscillator 22 through capacitor 80. The series combination of capacitor 80 and the effective resistance from the collector of transistor 77 to ground forms a variable capacitive-resistive element which delays the output of horizontal oscillator 22 to the input of horizontal driver 24 resulting in delayed initiation of turn off of horizontal output transistor 28 which determines the start of retrace and hence the start of trace. Of course, controllable time delay could be occasioned by an inductive-resistive element or other combination of reactive-resistive elements instead of the capacitor 80-transistor 77 combination shown.

Transistor 77 not only changes the time constant of the delay circuit, comprised of resistor 82, capacitor 80, resistor 86 and transistor 77, as a function of the effective resistance in series with capacitor 80, transistor 77 serves as an adjustable load to the output of horizontal oscillator 22 to change the amplitude thereof which in turn changes the instant of turn on of horizontal driver 24. Thus, the delay of the instant of turn off of horizontal output transistor 28 is occasioned by a combination of controlled delay of the output from oscillator 22 and controlled amplitude of the pulses applied to horizontal driver 24. It should be understood that either controlled delay or controlled amplitude alone could be utilized.

It should also be recognized that while the drawings show position correction circuit 60 coupled between horizontal oscillator 22 and driver 24, such a circuit could readily be coupled between horizontal sweep system 26 and driver circuit 24. Its purpose is to control the instant of turn off of horizontal output transistor 28 without affecting the frequency of the oscillator 22 so as to maintain the independence of the oscillator 22-AFC circuit 20 combination.

As explained above, short duration high beam current causes tertiary current to be drawn which changes energy balance in the horizontal sweep system and results in position shift of horizontal trace lines. Accordingly, values of resistors 72, 74, 78 and 79 and capacitor 76 are chosen such that transistor 77 is driven by the instantaneous value of the DC referenced voltage pulses to delay the instant of turn off of the horizontal output transistor in circuit 26 the amount necessary to compensate for the shift in horizontal trace lines caused by the shift of energy balance in the sweep system.

While resistor 84 is not an essential element of position correction circuit 60, resistor 84 permits an increase in the peak voltage at the collector of transistor 77 to improve the dynamic range of this device. Using an NPN device for transistor 77, and resistors 47 and 58 being 910 ohms and 6.8 K ohms respectively, one set of values for the components of dynamic position compensation circuit 60 which produce the above results is:

| | |
|---|---|
| Capacitor 76 | 0.01 ufarads |
| Resistor 74 | 18 K ohms |
| Resistor 72 | 35 K ohms |
| Resistor 78 | 15 K ohms |
| Resistor 79 | 27 K ohms |
| Capacitor 80 | 0.05 ufarads |
| Resistor 82 | 270 ohms |
| Resistor 84 | 62 ohms |
| Resistor 86 | 910 ohms |
| Capacitor 54 | 0.02 ufarads |

Dynamic width compensation circuit 62 in FIG. 3 corrects raster width distortion. During periods of short duration high beam current which reduces CRT anode voltage relative to the yoke field, the electron beams are deflected more than is desired and size blooming is experienced. Dynamic width compensation circuit 62 corrects for this problem by reducing horizontal yoke drive in response to the amplitude of the DC referenced voltage pulses across resistor 56 to maintain an appropriate ratio between yoke drive and CRT anode voltage.

Referring to FIG. 5 there is shown a portion of a television receiver from FIG. 3 with a specific example of dynamic width compensation circuit 62. In accordance with the present invention, width compensation circuit 62 comprises a diode 88, capacitor 90, resistor 92, capacitor 94 and resistor 96. Diode 88 is coupled between resistor 56 and pincushion circuit 52 by the parallel combination of capacitor 94 and resistor 96. Capacitor 90 and resistor 92 are connected in parallel between ground and the common connecting point of diode 88 with the parallel combination of capacitor 94 and resistor 96.

As described above with regard to FIG. 3, pincushion circuit 52 provides side pincushion correction by regulating the operation of winding 36 which in turn affects the drive to the horizontal deflecting winding in yoke 17. Although circuit 52 is illustrated as a pincushion correction circuit, it is to be understood that in accordance with the present invention any circuit capable of regulating the horizontal width of the CRT 16 raster in response to the signal from dynamic width compensation circuit 62 would be suitable. A specific embodiment of a suitable pincushion correction circuit 52 is illustrated in FIG. 6.

In the operation of the dynamic width compensation circuit 62, shown in FIG. 5, the DC referenced voltage pulses developed across resistor 56 are applied to diode 88 which removes the negative going spikes thereof, the resultant signal being filtered by capacitor 90 and resistor 92. The resultant filtered signal is coupled by the capacitor 94-resistor 96 combination to pincushion correction circuit 52. This coupling network is designed to be optimally responsive to short duration tertiary current rise, lasting for example less than one third of a field, so as to complement the natural raster width regulating effect occasioned by lowered +B supply voltage 43.

Figure 6:
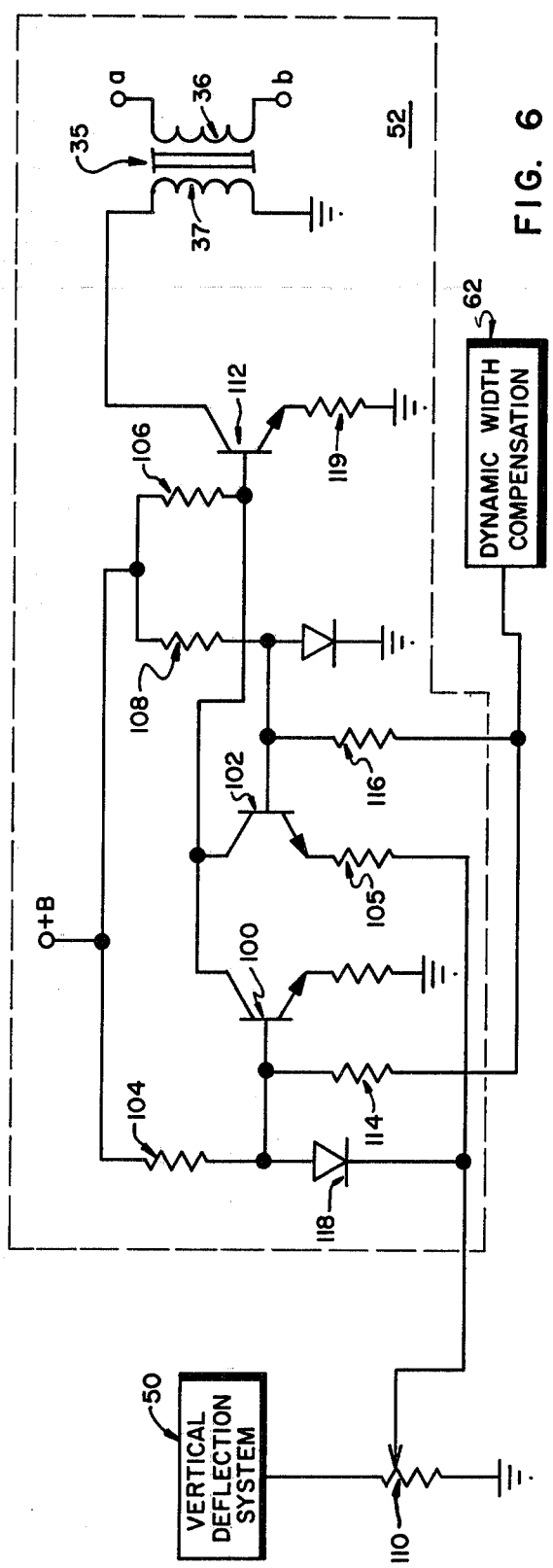
FIG. 6 is a circuit diagram of one embodiment of a pincushion correction circuit shown in FIG. 5.

Turning to FIG. 6, the illustrated embodiment of pincushion correction circuit 52 comprises transistors 100, 102 and 112, resistors 104, 105, 106, 108, 114, 116 and 119 and diode 118. The emitter of transistor 102 is coupled by resistor 105 to receive an input signal from vertical deflection system 50 as developed across resistor 110. Transistor 100 receives a like signal at its base through diode 118. The collectors of transistors 100 and 102 are both connected to the base of transistor 112, while the emitter of transistor 112 is grounded through resistor 119 and the collector is connected to control winding 37 of saturable reactor 35, the output winding 36 of which is connected at points "a" and "b" in the horizontal deflection circuit as shown in FIG. 3. Transistors 100, 102 and 112 are biased by resistors 104, 108 and 106 respectively.

Vertical deflection system 50 in response to vertical sync information from sync generator 18, FIG. 3, develops across resistor 110 a sawtooth voltage which centers near zero at the middle of each vertical trace. Consequently, during the top of each raster, a positive signal across resistor 110 drives transistor 100 into conduction which in turn drives transistor 112 toward cut off thereby decreasing the current flow through control winding 37. By the nature of the relationship between windings 37 and 36, a decrease in current through control winding 37 will cause an increase in the inductance of winding 36. Thus, saturable reactor 35 forms a variable inductor in series with yoke winding 34. This current decrease through control winding 37 provides an increase in inductance of winding 36 to realize a greater voltage drop across winding 36 and a lowering of yoke drive at the upper portion of each raster to provide side pincushion correction.

During the lower portion of each raster, a negative signal across resistor 110 drives transistor 102 into conduction which again causes decreased conduction in transistor 112 providing side pincushion correction for the lower portion of each raster. Both transistors 100 and 102 are cut off when the voltage from vertical output transformer 50 is near zero. Because both transistors 100 and 102 share a common collector load, the collector voltage waveform applied to transistor 112 is generally of parabolic shape. This voltage, applied to the base of transistor 112 provides control winding 37 with a current of generally parabolic shape. This current is maximum at the center of the vertical sweep and minimum at the ends, and it is the shape of this current which causes the horizontal sweep to be reduced at the lower and upper portions of the raster thereby providing the necessary pincushion correction.

In accordance with the present invention, the control signal from dynamic width compensation circuit 62 is applied to the bases of transistors 100 and 102 of pincushion correction circuit 52 through resistors 114 and 116 respectively. By driving the voltages at the bases of transistors 100 and 102 more positive, the control signal increases the conduction of transistors 100 and 102 and thus decreases the conduction of transistor 112. As a result, the current through control winding 37 will decrease to increase the inductance of winding 36 to control the yoke drive and thereby adjust raster width during periods of short duration high beam current in CRT 16. By selection of component values, the amount of width correction can be made to coincide directly with the amount of horizontal width distortion to maintain uniform raster width.

One set of values for the components of dynamic width compensation circuit 62 which produced the above results is:

| | |
|---|---|
| Capacitor 90 | 0.01 ufarad |
| Resistor 92 | 36 K ohms |
| Capacitor 94 | 0.068 ufarad |
| Resistor 96 | 200 K ohms |

A third element included in the scan compensation circuit 10 of FIG. 3 is peak beam current limiter 64. The need for peak current limiting is occasioned when the area of high brightness (area 7 in FIG. 1) is so intense that the rise in instantaneous beam current and the resultant rise in tertiary current in the horizontal sweep system become excessive. Excessive tertiary current can cause core saturation of sweep transformer 42 to cause raster tearing as illustrated in FIG. 1c.

Figure 7:
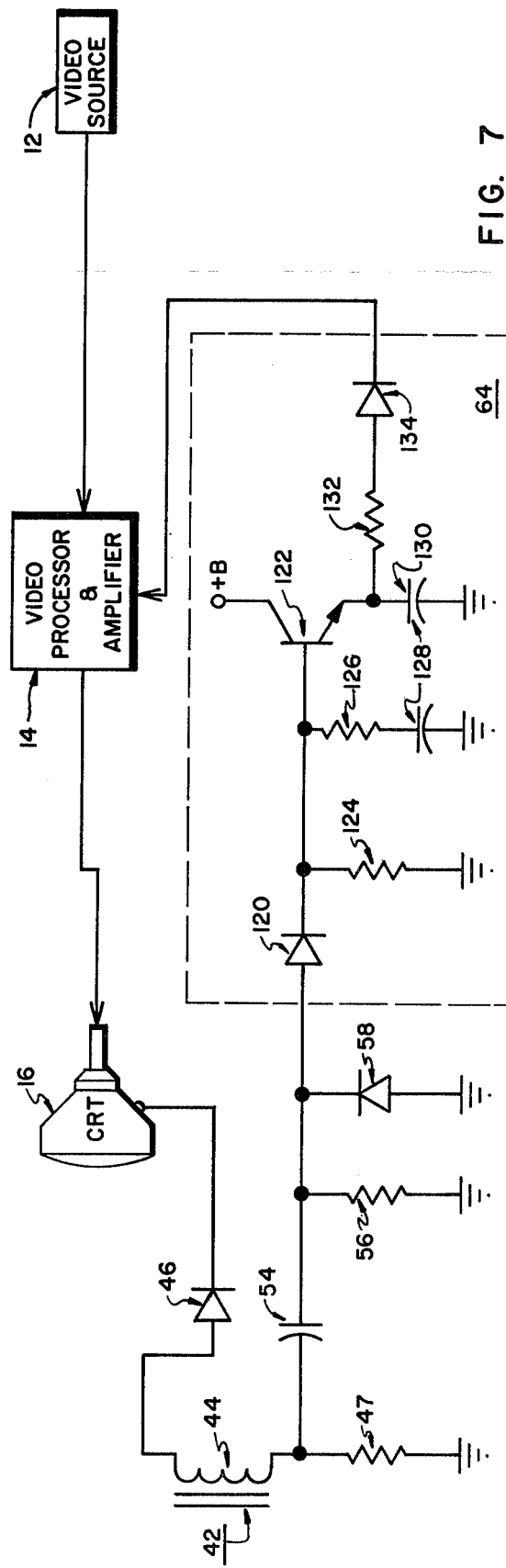
FIG. 7 is a circuit diagram of one embodiment of the peak beam current limiter circuit shown in FIG. 3.

As illustrated in FIG. 7, a preferred embodiment of peak beam current limiter 64 includes a diode 120 connected between diode 58 and the base of transistor 122. The base of transistor 122 is further connected to ground both through resistor 124 and through the series combination of resistor 126 and capacitor 128. The emitter of transistor 122 is connected to ground through capacitor 130. This emitter is further coupled to video processor and amplifier 14 through the series combination of resistor 132 and diode 134. The collector of transistor 122 is biased by a DC voltage source.

In effect, peak beam current limiter 64 forms a threshold control loop circuit to limit the magnitude of instantaneous beam current in CRT 16 in response to peak tertiary current in tertiary winding 44. The DC referenced voltage pulses across resistor 56 which are proportional to the instantaneous value of the tertiary current are applied to peak beam current limiter 64 at diode 120.

Diode 120, much like diode 88 of the dynamic width compensation circuit 62 of FIG. 5, removes the negative going spikes of the DC referenced voltage pulses appearing across resistor 56 and applies the resulting peak value to capacitor 128. Capacitor 128 with resistor 124 and the input impedance of transistor 122 comprise a long time constant voltage holding circuit, storing the peak value applied to it by diode 120. Resistor 126 in series with capacitor 128 limits the current drawing capability of capacitor 128 to avoid undue loading of the circuit by this capacitor.

The voltage across capacitor 128 essentially appears at the emitter of transistor 122 which, with its current amplifying capability, serves as as essentially stiff voltage source. For average video levels the voltage at the emitter of this transistor is less than the voltage representing video, which appears at the cathode of diode 134 by virtue of the diode being connected to video processor and amplifier 14. At video processor 14, increased scene brightness is represented by video increase in a negative direction from a voltage level above ground. Video increases of a magnitude and duration to cause excessively high beam current will cause the voltage at the emitter of transistor 122 to rise so that both video and emitter voltage increase will forward bias diode 134. When diode 134 is forward biased, it serves to clamp the video at the voltage established at the emitter of transistor 122. The voltage at the emitter of transistor 122 is essentially determined by the value of resistors 47 and 56 and the peak value of tertiary current and is such that the increase in beam current is limited to prevent sustained saturation of the flyback transformer.

Resistor 132 serves to cushion the clamping action of diode 134 so that the peak brightness isn't abruptly clamped so as to be noticeable to the viewer. With resistor 132 in the circuit the clamping action is softer, tending to reduce average brightness as well as limiting peak brightness. Peak beam current limiter 64 can be used in conjunction with normal beam current limiters which respond to average beam current in CRT 16.

While a particular embodiment of the present invention has been shown and described, it will of course be obvious to one skilled in the art that certain advantages and modifications may be effected without departing from the spirit of the invention, and accordingly, it is intended that the scope of the invention not be determined by the foregoing examples but only by the scope of the appended claims.

What is claimed and desired to be secured by Letters Patent of the United States is:

1. In a television receiver including a horizontal sweep system comprising output switch means in circuit with horizontal deflection windings and a flyback transformer having high voltage winding means for developing high voltage for the cathode ray tube of said television receiver, and further including a horizontal oscillator coupled to said output switch means for establishing retrace initiation times for said horizontal sweep system, a scan compensation circuit for correcting raster distortion occasioned by change in picture content between low and high brightness areas such that said cathode ray tube draws short duration high beam current resulting in loading of said horizontal sweep system, said scan compensation circuit comprising:

means in circuit with said high voltage winding means to develop a reference signal that is a function of instantaneous horizontal sweep system loading, and position distortion correction means coupled between said output switch means and said horizontal oscillator and responsive to said reference signal to control the timing of application of said horizontal oscillator output to said output switch means such that the initiation of retrace is delayed in accordance with said reference signal.

2. The invention recited in claim 1 wherein said television receiver further includes horizontal drive means responsive to the output of said horizontal oscillator to control the instant of turn off of said output switch means, said position distortion correction means being coupled to said horizontal drive means to delay the instant of turn off of said output switch means in accordance with said reference signal.

3. The invention recited in claim 2 wherein said means to develop a reference signal include time constant means responsive to the instantaneous amplitude of current in said high voltage winding means to produce a voltage proportional thereto, and further include means to establish a DC reference for said voltage such that said position correction means controls the start of retrace in said horizontal sweep system as a function of loading of said horizontal sweep system.

4. The invention recited in claim 3 wherein said scan compensation circuit further includes width distortion correction means coupled to said horizontal deflection windings and responsive to said reference signal to control the drive to said horizontal deflection windings in accordance with said reference signal, said width distortion correction means including variable reactance means in the output circuit of said output switch means and coupled to said horizontal deflection windings, the reactance of said variable reactance means being increased by said width distortion correction means to reduce the drive to said horizontal deflection windings in accordance with reference signal indication of horizontal sweep system loading.

5. In a television receiver including a horizontal sweep system comprising output switch means in circuit with horizontal deflection windings and a flyback transformer having high voltage winding means for developing high voltage for the cathode ray tube of said television receiver, a scan compensation circuit for correcting raster distortion occasioned by change in picture content between low and high brightness areas such that said cathode ray tube draws short duration high beam current resulting in loading of said horizontal sweep system, said scan compensation circuit comprising:

means in circuit with said high voltage winding means to develop a reference signal that is a function of instantaneous horizontal sweep system loading, and raster width distortion correction means including variable reactance means in the output circuit of said output switch means and coupled to said horizontal deflection windings, the reactance of said variable reactance means being increased by said raster width distortion correction means in accordance with reference signal indication of horizontal sweep system loading to directly and instantaneously reduce the drive to said horizontal deflection windings.

6. The invention recited in claim 5 wherein said scan compensation circuit further includes position distortion correction means coupled to said horizontal sweep system and responsive to said reference signal to delay initiation of sweep in accordance with said reference signal.

7. The invention recited in claim 5 wherein said means to develop a reference signal include time constant means responsive to the current in said high voltage winding means to produce a voltage that is proportional to the instantaneous value of said current, and further include means to establish a DC reference for said voltage such that said raster width distortion correction means controls the drive to said horizontal deflection windings as a function of the instantaneous loading of said horizontal sweep system.

8. The invention recited in claim 7 wherein said television receiver further includes pincushion correction means including said variable reactance means for controlling drive to said horizontal deflection windings to correct side pincushion raster distortion, said width distortion correction means modifying operation of said pincushion correction means in accordance with said reference signal to further control drive to said horizontal deflection windings to correct raster width distortion.

* * * * *